United States Patent Office 3,549,715
Patented Dec. 22, 1970

3,549,715
STABILIZATION
Charles L. Cormany, Wadsworth, William R. Dial, Akron, and Blaine O. Pray, Wadsworth, Ohio, assignors, by mesne assignments, to PPG Industries, Inc., a corporation of Pennsylvania
No Drawing. Continuation-in-part of application Ser. No. 712,693, Feb. 3, 1958. This application May 13, 1959, Ser. No. 812,791
Int. Cl. C07c 17/40
U.S. Cl. 260—652.5   3 Claims

ABSTRACT OF THE DISCLOSURE

Methyl chloroform containing nitromethane and a lower alkanol as stabilizers against its decomposition in the presence of metals.

---

This application is a continuation-in-part of application Ser. No. 712,693, filed Feb. 3, 1958 and now Pat. No. 3,499,047.

This invention concerns the stabilization of methylchloroform, and more particularly relates to the protection of methylchloroform against decomposition, reduction of its corrosive action, especially on metals, and avoidance of other types of instabilities manifested by methylchloroform during its use.

Methylchloroform (1,1,1-trichloroethane), a normally liquid chlorinated hydrocarbon, is a valuable industrial solvent useful for a diverse number of applications. One extensive use is as a liquid phase degreasing solvent wherein metal articles are immersed in a liquid body of the methylchloroform to remove from the articles greases, oils, dirt and the like. When so employed, methylchloroform has a strong tendency to decompose with undue rapidity. This decomposition is especially pronounced and alarmingly rapid with the light metals such as aluminum, magnesium and their alloys. Within all too brief a period, decomposition is so extensive the methylchloroform loses its practical value. Moreover, the metal articles may be seriously harmed.

Methylchloroform may also be useful as a vapor degreasing solvent. In vapor degreasing, vapors of the solvent are condensed upon metallic articles and oils, greases or the like removed therefrom, the condensate being collected and repeatedly revaporized, usually from a boiling body of the solvent. As a result oils, greases, particles of metal, etc. accumulate in the liquid body. Serious decomposition or degradation of the solvent occurs in this use. Unless avoided, this decomposition is a significant deterrent to the effective use of the solvent for vapor degreasing.

Methylchloroform is also a valuable vapor pressure depressant useful in conjunction with aerosol. It reduces the pressure of aerosol in sealed metal containers. Because of its peculiar nature, methylchloroform will corrode many of the metal containers especially with moisture present, and during normal conditions of aerosol use.

These stability problems impose serious restrictions upon the industrial use of methylchloroform. Unless overcome sufficiently, methylchloroform cannot be used with a requisite degree of effectiveness and facility.

Unfortunately, experiences in the stabilization of other halogenated hydrocarbons are irrelevant, methylchloroform presenting its own unique difficulties of stabilization.

In accordance herewith, methylchloroform is stabilized against one or more of its decomposition or corrosion tendencies by incorporating therein an appropriate concentration of nitroalkane, notably nitromethane. Methylchloroform compositions containing about 2 to 5 weight percent, or more, nitromethane are thus employed with increased effectiveness, for example, as liquid degreasing solvents and vapor pressure depressants. The extent of their resistance to decomposition or degradation and/or reduction in corrosiveness enhances the value of the methylchloroform.

Nitromethane concentrations upwards of about 2 percent by weight of the methylchloroform are recommended for protection against decomposition or degradation of the type encountered in liquid and/or vapor degreasing of metal articles, especially aluminum, magnesium and alloys thereof. A normal nitromethane concentration is between 2 and 5 percent or even 10 percent by weight of the methylchloroform although higher concentrations are not detrimental, usually just too costly. Lower concentrations, e.g., 0.5 weight percent, are possible but not, as a rule, recommended with nitromethane is the sole stabilizing component of the composition. With other stabilizing materials, these lower concentrations are useful.

Methylchloroform compositions stabilized with nitromethane may include other components without detracting from their stability. For example, alcohols and epoxides (oxiranes) may be dissolved therein. Moreover, the presence of components other than nitroalkanes which augment the stability of methylchloroform is contemplated.

Among these alcohols are normally liquid aliphatic alcohols such as the lower alkanols, methanol, ethanol, isopropanol, propanol, n-butanol, t-butanol, t-amyl alcohol, 2-octanol, propargyl alcohol, allyl alcohol, methylbutynol, 3-methyl-1-pentyne-3-ol, 2-methyl-3-butyne-2-ol, dimethylhexyndiol and dimethyloctynediol. Organic epoxides (oxiranes), those compounds having an oxygen atom linked to two adjacent linked carbon atoms, e.g., the group

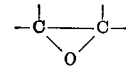

include ethylene oxide, propylene oxide, glycidol, the various butylene oxide isomers, epichlorohydrin, styrene oxide, cyclohexene oxide, butadiene monoxide and butadiene dioxide, or the like epoxides having 2 to 10 carbon atoms. Alcohol or epoxide concentrations are usually upwards of 0.5 percent (e.g., 0.05 to 10 percent, preferably 0.5 to 3 percent) by weight of the methylchloroform.

When using more than one stabilizing component, economics and other considerations, as a rule, limit the total concentration of all stabilizers to no more than 10 percent and usually between 2 and 8 percent by weight of the methylchloroform. The respective stabilizing components are often employed in equal concentrations.

These examples demonstrate the stabilizing effect of methylchloroform compositions containing a nitroalkane.

EXAMPLE I

The stability of methylchloroform compositions were evaluated by a test procedure which included placing 50 cubic centimeters of the composition in a 250 cubic centimeter glass flask and refluxing under atmospheric conditions under total reflux the composition. A small strip of scatched aluminum (½ inch by 1½ inches polished aluminum) were immersed in the boiling methylchloroform throughout refluxing. Refluxing was continued until the stabilizing effect of the compound in methylchloroform was no longer observed as indicated either by formation of tars, evolution of hydrogen chloride or appearance of precipitates.

In such test procedure, methylchloroform without any stabilizing component turned black (indicating undesirable extensive decomposition) after refluxing for about 5 minutes.

Table I lists the results obtained with nitromethane containing methylchloroform compositions:

TABLE I

| | Stabilizer components | | Total reflux time before decomposition (hours) |
|---|---|---|---|
| | Name | Concentration, percent by weight | |
| Test: | | | |
| A | None | | 0.1 |
| B | Nitromethane | 3.0 | *104 |
| C | Nitromethane | 3.0 | *140 |
| | Butylene oxides | 1.0 | |
| D | Nitromethane | 3.0 | *140 |
| | Isopropanol | 3.0 | |

*Refluxing stopped, no decomposition occurred during this time interval.

EXAMPLE II

In this example, 50 milliliters of methylchloroform containing 3 percent by weight nitromethane were placed in a 120-milliliter glass flask fitted with a reflux condenser. An aluminum (aluminum standard alloy 2024) strip (1/16 inch by 1/2 inch by 3 inch) was placed in the flask such that its lower portion was immersed in the liquid contents (the liquid was about 3/4 inch deep) and tilted at an angle of about 45 degrees.

With the aluminum strip present, the methylchloroform was refluxed at atmospheric pressure for 500 hours, at which time refluxing was halted. The methylchloroform showed no apparent change in color or decomposition throughout this reflux period. Both the portion of the aluminum strip immersed in the liquid and the upper portion in contact with methylchloroform vapors remained substantially clear, indicating little, if any, corrosion.

This procedure was repeated except that 2 cubic centimeters of water were included in the methylchloroform composition. When the refluxing was halted after 58 hours, the color of the methylchloroform was not visibly altered. Very slight corrosion was indicated in the liquid phase and none in the gas phase by studying the aluminum strip.

By comparison, inadequately stabilized or unstabilized methylchloroform having this concentration of water decomposed seriously with blackening within 15 hours.

Besides nitromethane, other nitroalkanes offer stabilizing properties when included in methylchloroform. Normally liquid nitroalkanes soluble in methylchloroform in stabilizing concentration, notably those having up to and including three carbon atoms such as nitroethane, alpha-nitropropane and $\beta$-nitropropane are of use. However, nitromethane is outstanding, especially for vapor degreasing compositions.

While the invention has been described with respect to certain details of particular embodiments, it is not intended the invention be construed as limited to such details except insofar as they appear in the appended claims.

We claim:
1. A composition of matter comprising methylchloroform containing about 0.5 to 10 percent of a lower alkanol and about 0.5 to 10 percent of a nitroalkane having 1 to 3 carbon atoms based on the weight of the methylchloroform.
2. The composition of claim 1 wherein the nitroalkane is nitromethane.
3. A composition of matter comprising methylchloroform containing about 0.05 to 10 percent tertiary amyl alcohol and about 0.5 to 10 percent nitromethane based on the weight of the methylchloroform.

References Cited

UNITED STATES PATENTS

| 2,567,621 | 9/1951 | Skeeters et al. | 260—652.5 |
| 2,371,644 | 3/1945 | Petering et al. | 260—652.5 |

FOREIGN PATENTS

| 773,187 | 4/1957 | Great Britain | 260—652.5 |

HOWARD T. MARS, Primary Examiner

U.S. Cl. X.R.

252—170, 171, 407